UNITED STATES PATENT OFFICE.

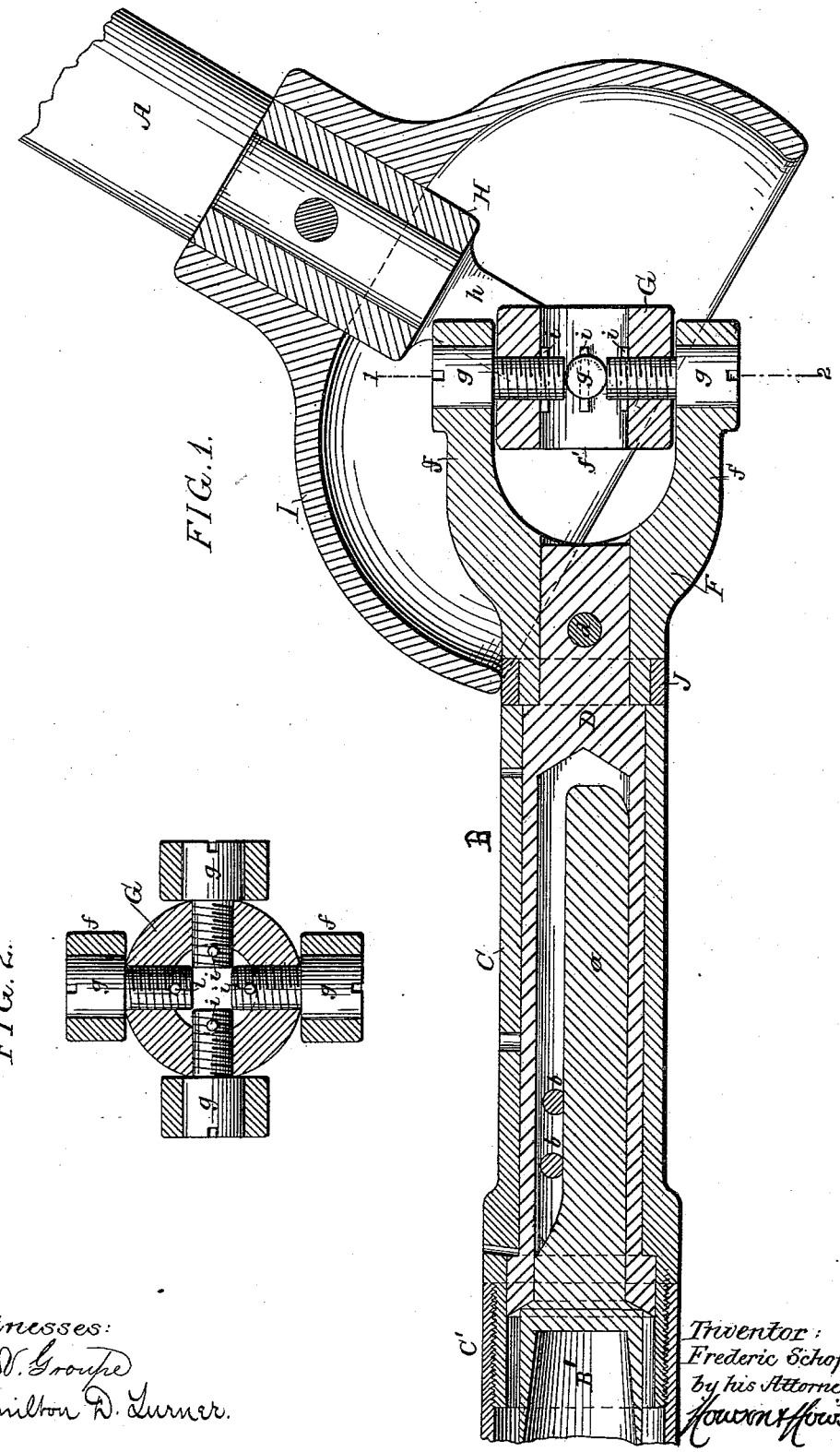

FREDERIC SCHOFF, OF PHILADELPHIA, PENNSYLVANIA.

UNIVERSAL-JOINT COUPLING.

SPECIFICATION forming part of Letters Patent No. 420,284, dated January 28, 1890.

Application filed July 27, 1889. Serial No. 318,851. (No model.)

*To all whom it may concern:*

Be it known that I, FREDERIC SCHOFF, a citizen of the United States, and a resident of Philadelphia, Pennsylvania, have invented certain Improvements in Universal-Joint Couplings, of which the following is a specification.

The object of my invention is to provide a universal-joint connection between two shafts with devices whereby the angular relation of the two shafts is restricted to an angle less than a right angle.

A further object of my invention is to simplify the construction of the joint itself.

In the accompanying drawings, Figure 1 is a longitudinal section showing the ends of two shafts provided with my improved universal-joint connection, and Fig. 2 is a section on the line 1 2, Fig. 1.

In the present instance I have shown my invention as applied to the coupling together of a solid shaft and a flexible shaft; but it will be understood that my invention can be carried out as well in the coupling together of two solid shafts or two flexible shafts.

Referring to the drawings, A is a solid shaft, in the present instance fixed in suitable bearings, and B is a movable shaft coupled to the shaft A, as described hereinafter, and provided with a flexible section B', having a recessed or flattened stem $a$, which is adapted to the hollow arbor D of the shaft B, the stem being confined circumferentially to the arbor by means of transverse pins $b\ b$, but is free to move longitudinally within the arbor to accommodate the various movements of the shaft. Surrounding the arbor D is a sleeve C, which constitutes a hand-piece, being secured in the present instance to and forming a continuation of a casing or envelope C' of the flexible shaft. Secured to the reduced end of the arbor D by a transverse pin $d$ is a coupling-head F. The sleeve C, fitting between the end of the coupling-head F and a shoulder on the rear end of the arbor, is prevented any longitudinal movement.

The coupling-head F is reduced at its rear end, forming, with the sleeve C, an annular groove, in which rests the anti-friction ring J, described hereinafter. This ring is free to revolve on the shaft B, but is confined longitudinally thereon.

The coupling-head F is forked so as to form two arms $f\ f$, the outer ends of which are provided with openings for the reception of the heads of screws, the threaded stems of which are adapted to threaded openings in the opposite sides of a cylindrical coupling-block G, the backing off or loosening of these screws being prevented by means of pins $i$, passed through the screws and bearing against the inner side of the cylindrical coupling-block G.

To the reduced portion of the shaft A is secured by means of a pin $a$ a coupling-head H, with arms $h$, which pass on each side of the coupling-block G, and hung thereto by screws $g$, similar to and confined to the coupling-block in the same manner as the screws of the coupling-head F, the screws of one head being at right angles to those of the other head, as in ordinary universal-joint couplings. As the screws $g$ are rigidly confined to the coupling-block G, the projecting heads of the screws form trunnions or pintles on which the arms of the coupling-heads can freely vibrate, so as to permit the shafts to assume different angles in respect to each other.

Mounted on the shank of the coupling-head H, and secured thereto and to the shaft A by the transverse pin, is a guard or shield in the form, preferably, of a hemisphere I, the annular rim of the hemisphere serving, by contact with the anti-friction ring J upon the shaft B, to so restrict the angular adjustment of the shaft B in respect to the shaft A that the limit of safety can never be exceeded, the ring J serving to prevent excessive frictional wear of the parts when the shield is in action and insuring easy running of the several parts.

The cup-shaped shield or guard I partially incloses the joint between the shafts, and in a measure protects the same from injury and prevents the rapid accumulation of dirt thereon. While this is not considered of importance, however, the shield may be made in open or skeleton form and may be conical or in other forms, if desired. Thus by constructing the coupling in the manner described I prevent the accidents caused by the driven shaft assuming a position at right angles to the driving-shaft, as in no case can the shafts assume such an angle in respect to each other.

Having thus described my invention, I claim and desire to secure by Letters Patent—

1. The combination of the two shafts and the universal-joint connection between them, a guard I, carried by one shaft, with a ring J, carried by the other shaft, said ring being confined longitudinally, but free to revolve thereon, and being in such a position in respect to the guard that it will take the bearing of the guard when the shafts are at a given angle in respect to each other, substantially as and for the purpose specified.

2. The combination of the shaft A, coupling-head H, with a guard I, a pin securing the head and guard to the shaft, with a shaft B, coupling-head F thereon, a coupling-block G, with a ring J confined between the head F and the body of the shaft, substantially as specified.

3. The combination of the shaft A, carrying a coupling-head H and a hemispherical guard I, a coupling-block G, with a shaft B, arbor D, a sleeve C on said arbor, with a coupling-head F secured to the end of the arbor and reduced at its rear end, with a ring J mounted on said reduced portion and confined longitudinally by the head and the sleeve in such a position that the guard I will bear against its periphery when the shafts assume a given angle in respect to each other, substantially as set forth.

In testimony whereof I have signed my name to this specification in the presence of two subscribing witnesses.

FREDERIC SCHOFF.

Witnesses:
 WILLIAM D. CONNER,
 HARRY SMITH.